April 30, 1940. A. E. BROWN 2,199,356
GLASSWARE FORMING APPARATUS
Filed April 16, 1937
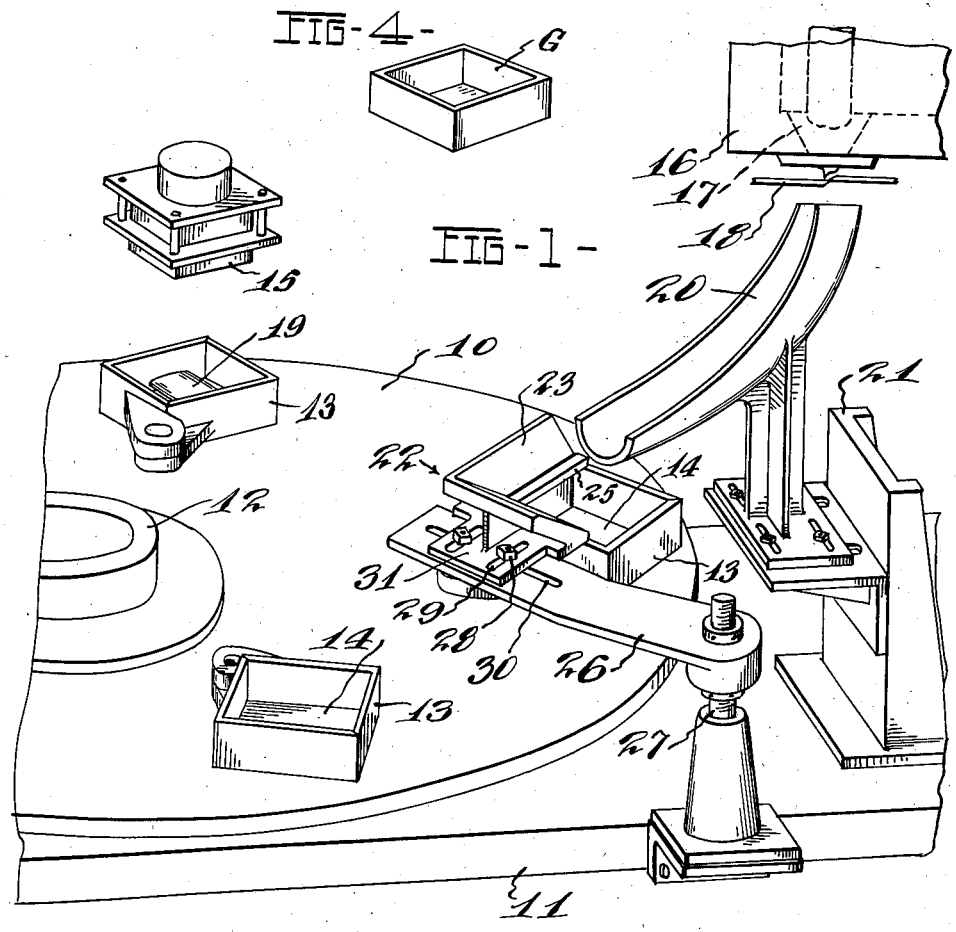
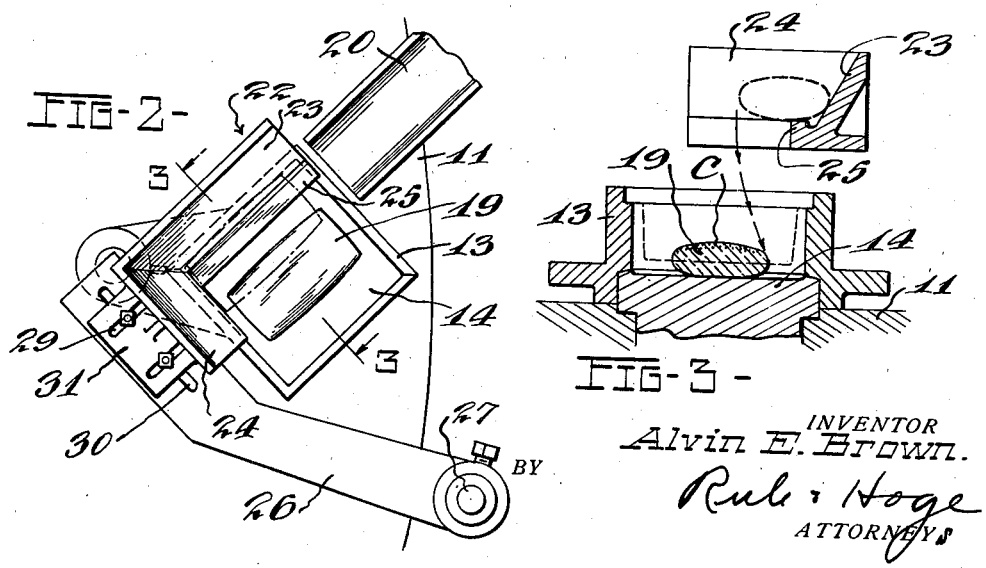
INVENTOR
Alvin E. Brown.
BY
Rule & Hoge
ATTORNEYS Patented Apr. 30, 1940

2,199,356

UNITED STATES PATENT OFFICE 2,199,356

GLASSWARE FORMING APPARATUS

Alvin E. Brown, Muncie, Ind., assignor to Owens-Illinois Glass Company, a corporation of Ohio Application April 16, 1937, Serial No. 137,195

3 Claims. (Cl. 49—14)

My invention relates to apparatus for forming glass articles and is particularly concerned with the delivery of mold charges of molten glass to molds in which sections of hollow glass building blocks or other articles are produced.

According to one method of producing half sections of hollow glass building blocks, measured quantities or mold charges of molten glass are delivered by gravity to open-topped molds of the desired configuration, these mold charges being then pressed in said molds to the desired final shape. In the delivery of the mold charges to the molds, they are guided from a flow feeder to the former by means of a downwardly inclined chute or trough which of necessity chills the lower side of the mold charge contacting the chute to some extent and in fact to such a depth that without the employment of the present invention or its equivalent, the exterior face of the resultant block section would be checked or otherwise marred so that it would be unfit for commercial use. This is true because of the fact that ordinarily the chilled surface of the mold charge would contact the bottom of the mold which is also comparatively cool, and it would therefore be impossible to reheat and iron out the cooled area so that it would conform to the exact shape of the mold bottom and remove cords and strains therein.

An object of the present invention is the provision of novel means readily adaptable to commercial apparatus for inverting mold charges immediately after they have left the trough or chute and are about to drop into the forming molds. Thus, that surface chilled by the chute or trough finally becomes a part of the inner surface of the block half and is reheated and distributed during the forming of the charge in such fashion that the cords and strains therein disappear.

Another object of the invention is the provision of inverting mechanism of the above character which is adjustable horizontally and vertically independently of the forming molds and trough or chute so that ideal operating conditions may be obtained and maintained.

Other objects will be in part apparent and in part pointed out hereinafter.

In the drawing:

Fig. 1 is a fragmentary perspective view of a forming apparatus illustrating one embodiment of my invention.

Fig. 2 is a fragmentary top plan view showing a forming mold directly beneath the mold charge inverting device constituting the present invention.

Fig. 3 is a transverse sectional view taken substantially along the line 3—3 of Fig. 2.

Fig. 4 is a perspective view of a half section of a building block of the form intended to be produced by the apparatus shown in Fig. 1.

The preferred embodiment of my invention is shown in conjunction with glassware forming apparatus which includes a rotary mold table 10 mounted upon a base 11 for rotation about a vertical central column 12, and supporting an annular series of partable molds 13. A bottom plate 14 constituting a part of each mold is intended, when the molds are forming half sections of building blocks, to produce the desired design or surface formation on the bottom of the block half, which bottom incidentally constitutes one exposed face of a finished block. A press plunger 15 of conventional or any preferred form, is intended to press the molten glass to its final shape in the molds 13. Mold charges are obtained by flowing a stream of glass from a feeder boot 16 through a bottom outlet orifice 17 therein and by means of cut-off mechanism 18 or shears, severing the stream into measured quantities or mold charges 19 which are guided by a trough 20 or chute to a point directly above one of the molds. This trough is adjustably mounted upon a base 21 so that it may be accurately positioned with respect to the bottom outlet opening 17.

The mold charge or gob inverting device consists of a horizontal L-shaped baffle 22 including an inclined longitudinal side wall 23 and an inclined end wall 24, the former terminating at its lower margin in a horizontal ledge 25 extending longitudinally thereof. The inclined longitudinal side wall 23 of the baffle and horizontal ledge 25 are positioned in close proximity to the discharge end of the chute 20 or trough and in effect constitute an extension of the chute or trough. The ledge 25 is of such width with respect to the dimensions and proportions of the mold charge and so positioned with respect to the mold that a charge of glass rests on said ledge only momentarily and then rolls off of the ledge and drops into the central area of the mold. The vertical spaced relation between the mold bottom 14 and ledge 25 is such that the mold charge turns approximately 180° about its longitudinal axis thereby positioning the chilled surface C for initial engagement with the press plunger 15. The end wall 24 of the baffle, operates to prevent movement of the mold charges beyond the molds in the event the momentum tends to carry the charges too far.

In order that the gob inverting device may be adjusted to meet various requirements, the baffle is mounted for multi-adjustment on a horizontal arm 26 which in turn is supported for vertical adjustment on a jack-screw 27 or the like pedestal. Adjustable connection between the baffle and arm may be obtained by means of bolts 28 extending through aligned slots 29 and 30 in a flange 31 and said arm 26 respectively.

While the present apparatus is primarily intended to be utilized in conjunction with a machine for producing glass block sections G such for example as shown in Fig. 4, it is obvious that it is equally adaptable for use in machines for producing other pressed open-topped articles.

Modifications may be resorted to within the spirit and scope of the appended claims.

I claim:

1. In combination, a forming mold having an upwardly opening mold cavity, a trough for guiding a mold charge to a position directly above the mold cavity and in vertical alignment therewith and from which position the charge is adapted to fall by gravity into the cavity, and a horizontal ledge extending across the mold cavity in proximity to the discharge end of said trough and slightly to one side of the longitudinal center of the latter for inverting the mold charge prior to its entry into the cavity.

2. The combination with a container for molten glass provided with a discharge orifice and severing means for severing charges of molten glass beneath the orifice and a downwardly inclined chute for conducting severed charges away from the orifice, of charge reversing means comprising an abutment in alignment with the chute and spaced therefrom a distance greater than the length of a charge and against which charges issuing from the lower end of the chute are adapted to strike, and a horizontal ledge of a width less than one-half the width of the charge positioned between the abutment and chute and below the latter and to one side of the center line thereof and adapted to underlie one edge of the charges as they strike said abutment.

3. The combination with a mold having an upwardly opening cavity to which charges of molten glass are adapted to be delivered by gravity, of means for delivering charges of molten glass into the cavity including a downwardly inclined chute for conducting the charges toward the mouth of the cavity, an abutment in alignment with the chute and spaced therefrom a distance greater than the length of a charge and against which the charges issuing from the lower end of the chute are adapted to strike, a horizontal ledge of a width less than one-half the width of a charge positioned between the abutment and chute and below the latter and to one side of the center line thereof and adapted to underlie one edge of the charges as they strike said abutment, and means for adjustably raising and lowering the ledge with respect to the mold.

ALVIN E. BROWN.